United States Patent [19]

Hosokawa

[11] Patent Number: 5,080,922
[45] Date of Patent: Jan. 14, 1992

[54] METHOD AND APPARATUS FOR CONTINUOUSLY CHOPPING, PULVERIZING AND MIXING FROZEN RAW MATERIAL SUCH AS ANIMAL MEAT, FISH MEAT AND BEANS

[75] Inventor: Toshio Hosokawa, Tokyo, Japan

[73] Assignee: Iwai Kikai Kogyo Co., Ltd., Tokyo, Japan

[21] Appl. No.: 465,223

[22] PCT Filed: Aug. 11, 1989

[86] PCT No.: PCT/JP89/00818

§ 371 Date: Mar. 9, 1990

§ 102(e) Date: Mar. 9, 1990

[87] PCT Pub. No.: WO90/01267

PCT Pub. Date: Feb. 22, 1990

[30] Foreign Application Priority Data

Aug. 13, 1988 [JP] Japan .................. 63-202118

[51] Int. Cl.$^5$ .......................... A23L 1/00; B02C 19/00
[52] U.S. Cl. ...................................... 426/646; 241/13; 241/161; 241/260.1
[58] Field of Search ............... 426/646, 518, 634, 524; 241/260.1, 161, 8, 13, 23, DIG. 37

[56] References Cited

U.S. PATENT DOCUMENTS 4,450,183  5/1984  Steinberg et al. .................. 426/646
4,906,486  3/1990  Young .................. 426/518

FOREIGN PATENT DOCUMENTS 58-126757  7/1983  Japan .................. 426/646

Primary Examiner—George Yeung
Attorney, Agent, or Firm—Armstrong, Nikaido, Marmelstein, Kubovcik & Murray

[57] ABSTRACT

An apparatus and method for continuously chopping, pulverizing and mixing edible material such as animal or fish meat which involves continuously chopping square-shaped frozen blocks of the material and adding thereto sodium carbonate or sodium bicarbonate, and sodium chloride or sodium caseinate, mixing and pulverizing the resultant mixture and adding an emulsifying agent thereto to prepare an emulsion. The method is further applicable to chopping, pulverizing and mixing beans by continuously chopping square-shaped frozen blocks of coarsely ground beans and pulverizing the chopped material. The apparatus includes a chopping cylinder, a chopping rotary drum rotatably mounted and having a feed screw and a plurality of chopping knives, a feeding device for feeding the blocks of frozen raw material, and a delivery ridge portion formed in an outer peripheral surface of the chopping drum, wherein the pulverizing unit has a pulverizing cylinder and a rotatably mounted pulverizing rotary drum having pulverizing knives, a plurality of scrapper blades and feeding ridge portions.

11 Claims, 13 Drawing Sheets

METHOD AND APPARATUS FOR CONTINUOUSLY CHOPPING, PULVERIZING AND MIXING FROZEN RAW MATERIAL SUCH AS ANIMAL MEAT, FISH MEAT AND BEANS

TECHNICAL FIELD OF THE INVENTION

The present invention relates to a method and apparatus for continuously chopping and pulverizing frozen raw material for thermally-gelled protein foods, and more particularly to those enabling proteins being the essential components of animal meat, fish meat and beans to effectively perform their functions to a maximum extent.

BACKGROUND ART OF THE INVENTION

Among so-called protein foods which contain proteins as essential components thereof or are eaten to ingest proteins, the thermally-gelled protein foods vary in quality, size and shape. In order to produce these thermally-gelled protein foods, it is required to chop, grind and mix the raw material.

In chopping, grinding and mixing processes of the raw material, it is required that the raw material is chopped as finely as possible so that as much proteins contained as possible may be extracted from cells of the raw material and auxiliary materials be as uniformly as possible dispersed in the raw material to function as effectively as possible to the extracted protein. Consequently, with proteins fuctioning to a maximum extent, the products is improved in binding properties and water-retention properties thereof. In case that such processes are not effectively conducted, it is not possible to obtain high-quality thermally-gelled products. Namely, the products are poor in binding properties and water-retention properties to result in poor-appetite.

These chopping, grinding and mixing processes suffer from many problems. For example, muscular fiber size and tenderness of the meat vary depending on cuts, sex, age, breeds and species of the slaughter animals. Consequently, when different kinds of meat are directly processed together through meat-treating machines, it is not possible to obtain good meat products with uniform particle size. Therefore, in case that different kinds of meat are employed as the raw material for the meat products, it is necessary that the different kinds of meat are differently chopped coarsely in a first stage followed by a common second stage in which the coarsely chopped different kinds of meat are further chopped together as finely as possible. This means a plurality of stages are required there.

In addition, in the chopping, grinding and mixing processes, the raw material is subjected to an external force and there is generated a frictional heat. In general, proteins are non-reversibly denatured when heated, to become denatured proteins. Accordingly, it is necessary to suppress the generation of heat as effectively as possible. However, this is not possible in the prior art, and, therefore, hitherto it has not been possible to sufficiently conduct these chopping, grinding and mixing processes. As a result, in the prior art, it is not possible for proteins to sufficiently function in manufacturing the meat products. In manufacturing the meat products, high-grade raw material may be effectively employed without any problem. In contrast with this, lowgrade raw material such as sinewy meat or the like containing some components which prevent thermal gellation is either impossible to be employed in many facturing of the meat products or brings about meat products poor in quality, even if employed.

In the prior art, since it is not possible to sufficiently conduct the chopping, grinding and mixing processes, a considerable amount of auxiliary raw material such as salt and the like must be added to the raw material even when the high-grade raw material is employed. However, this undesirably provides such foods as containing salt at a high level unhealthful. The present invention dissolves at a stroke the above problems involved in the chopping, grinding and mixing processes of the animal meat, fish meat and beans and provides such method and apparatus that evable the raw material to be chopped, ground and mixed continuously and in a short time to give fine particles of ideal size without denaturing the proteins at all.

DISCLOSURE OF THE INVENTION

An object of the present invention resides in providing a method for continuously chopping, pulverizing and mixing animal meat and fish meat, by continuously following the steps of:

chopping square shaped blocks of the animal meat or fish meat frozen at a temperature of from −5 to −30 °C.;

adding, to the resultant chopped material, 0–0.5 parts by weight of sodium carbonate or sodium bicarbonate and 0–5 parts by weight of sodium chloride or sodium caseinate based on 100 parts by weight of the chopped material to regulate the pH thereof at a range of from 6 to 8;

mixing and pulverizing the resultant mixture to prepare a fine mixture; and adding, to the fine mixture, an emulsifying agent at a predetermined rate to prapare an emulsion.

In the above method, the mixture may be deaerated under reduced pressure.

Another object of the present invention resides in providing a method for continuously chopping, pulverizing and mixing beans by continuously following the steps of:

forming a square-shaped block of frozen beans prepared by coarsely grinding after soaking in water and frozen at a temperature of −5 to −30° C.;

chopping the square-shaped block continuously to prepare a granular material; and pulverizing the granular material.

Further object of the present invention resides in providing an apparatus for continuously chopping, pulverizing and mixing animal meat, frozen fish meat and beans comprising:

a chopping unit constructed of;

a chopping cylinder provided with at least one feed opening for feeding the blocks of frozen raw material and at least one delivery opening for discharging the chopped raw material, a chopping rotary drum rotatably mounted in the chopping cylinder and having both a spiral ridge portion provided on its outer peripheral surface and forming a feed screw and plural pairs of chopping knives each with a substantially (Goliath crane)-shaped cutting edge oriented in a rotational direction of the chopping rotary drum, each pair of knives being arranged in row parallel to the axis, and on the outer peripheral surface, of the chopping rotary drum, with such pair as different in symmetry from each other radially oppositely disposed on the outer peripheral surface of the chopping rotary drum, the pairs of the knives being equally spaced apart from each other in both of circumferential and longitudinal directions of the chopping rotary drum, a feeding device provided in the feed opening for feeding the block of frozen raw material therethrough, said feeding device being provided with a means for reciprocally moving the raw material in an axial direction of the chopping rotary drum, an auxiliary member provided in an inner wall of the chopping cylinder for proventing the chopped frozen raw material from passing through a clearance between the inner wall of the chopping cylinder and an outer peripheral surface of the spiral ridge portion, and a delivery ridge portion formed in an outer peripheral surface of the chopping rotary drum at a position corresponding to that of the delivery opening; and a pulverizing unit constructed of;

a pulverizing cylinder provided with an inlet opening for receiving the frozen raw material chopped by the chopping unit and an outlet opening for discharging the frozen raw material pulverized, and;

a pulverizing rotary drum rotatably mounted in the pulverizing cylinder, said rotary drum having a plurality of pulverizing knives arranged on rows which extend in axial direction, a plurality of scraper blades each provided with a scraping edge and an oblique feeding surface and arranged in such spirally shifted positions corresponding to that of said inlet opening so as to define a spiral path on the peripheral surface of the rotary drum, and feeding ridge portions formed in positions corresponding to that of said outlet opening, each of said pulverizing knives being formed with a sectionally triangular shaped edge portion having a cutting edge on the hypotenuse thereof, said pulverizing knives of each row being fixedly arranged parallel to each other and slightly deviated from the rotational direction of the rotary drum, with the cutting edges directed upward and forwardly sloped in rotational direction of the pulverizing rotary drum, such that, between a pair of rows with the pulverizing knives each different in direction of the deviation but corresponding in its position and another pair of similar rows, two rows of pulverizing knives are interposed, respectively so that axial position of each knife of one pair of row corresponds to that of another pair of rows and each direction of said deviation orients at its leading edge portion toward the raw material inlet opening and at its trailing edge portion toward the outlet opening, said scraper blades being arranged such that each oblique feeding surface constitutes a spiral element for feeding upward, and said outlet opening for the pulverized being arranged on a position corresponding to the delivery opening of the chopping rotary drum.

In the above apparatus, the chopping cylinder may be provided with at least one feed opening for feeding a frozen auxiliary raw material.

The raw material block feeding device in the above apparatus comprises a feed sleeve connected to the feed opening provided on the chopping cylinder for feeding the frozen raw material and extending radially outward therefrom and a hopper mounted on a free end portion of the feed sleeve, and such a construction is preferred that the feed sleeve has a first holding plate for pressing the frozen raw material block against an upper wall of the feed sleeve lest the frozen raw material should move freely; an actuator for the holding plate; second holding plates for grasping the frozen raw material to be reciprocally moved in an axial direction of the chopping rotary drum and second actuators for the second holding plates, and the hopper is provided therein with a movable guide plate whose movable-end portion is engaged with an upper-end portion of the first holding plate.

In the above apparatus, the pulverizing unit can be connected to a finishing unit comprising:

a finishing cylinder having an inlet opening for receiving the pulverized raw material from the pulverizing unit and an outlet opening for discharging the raw material subjected to a finishing treatment, and a finishing rotary drum rotably mounted in the finishing cylinder, said finishing rotary drum having a plurality of finishing knives arranged on rows which extend in axial direction, a plurality of scraper blades each arranged in such spirally shifted positions corresponding to that of said inlet opening so as to define a spiral path on the peripheral surface of the rotary drum, and feeding ridge portions formed in positions corresponding to that of said outlet opening, each of said finishing knives being formed with a sectionally triangular shaped edge portion having a cutting edge on the hypotenuse thereof, said finishing knives of each row being fixedly arranged parallel to each other and slightly deviated from the rotational direction of the rotary drum, with the cutting edges directed upward and forwardly sloped in rotational direction of the finishing rotary drum, such that, between a pair of rows with the finishing knives each different in direction of the deviation but corresponding in its position and another pair of similar rows, two rows of finishing knives are interposed, respectively so that axial position of each knife of one pair of rows corresponds to that of another pair of rows and each direction of said deviation orients at its leading edge portion toward the raw material inlet opening and at its trailing edge portion toward the outlet opening.

The chopping unit may be connected to the puverizing unit, with each cylinder and rotary drum integrally connected, so that the rotary drums may be driven by a single common shaft. Further, the chopping unit, the pulverizing unit and the finishing unit may be connected, with each cylinder and rotary drum integrally connected so that the rotary drums may be driven by a single common shaft.

The chopping unit and the pulverizing unit or the chopping unit, the pulverizing unit and the finishing unit may be indirectly connected through piping.

In the method according to the present invention, the raw material and the apparatus need not be cooled during the processing. This is because there is employed a frozen raw material as the starting material and thus any temperature rise is restricted by a latent heat of fusion of the ice or because the required time for the processing is very short to allow the frozen raw material to be completely pulverized before melting.

In the method of the present invention, it is required for the frozen raw material to assume a substantially square-shaped block so that an amount of the raw material processed may be kept constant, and it is also required that the blocks have a same size in a cycle of the processes.

DETAILED DESCRIPTION OF THE PREFERRED EMBODIMENT

Now, an apparatus of the present invention for continuously chopping, pulverizing and mixing animal meat, fish meat and beans will be described in detail hereinbelow with reference to the accompanying drawings.

Figure 1:
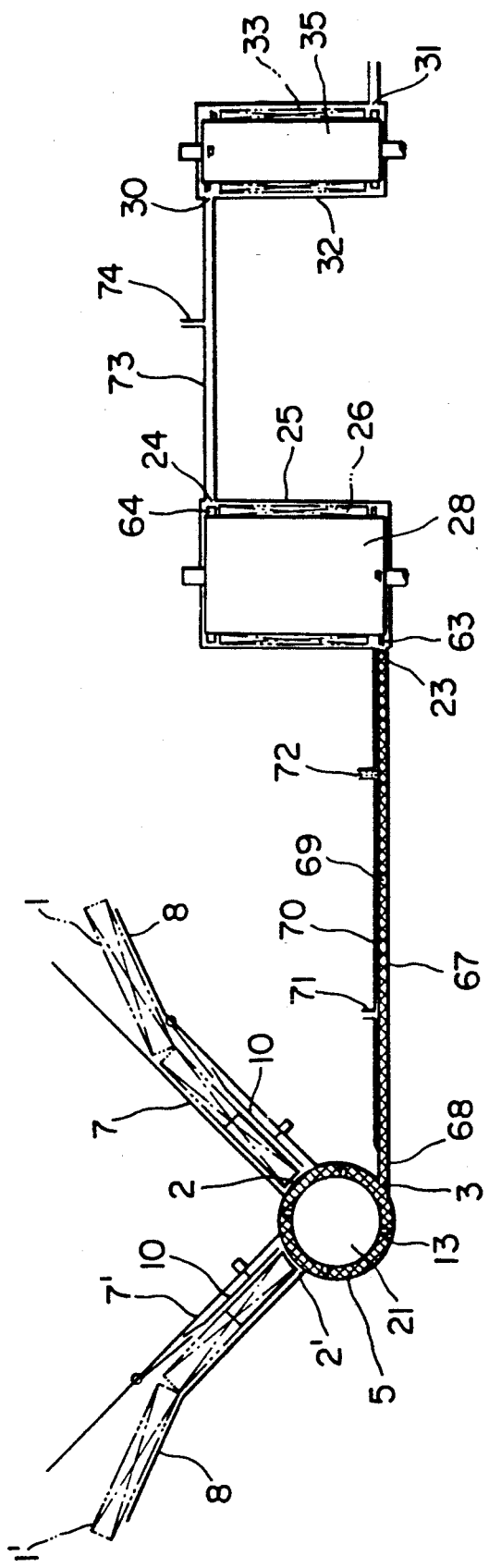
FIG. 1 is a block diagram of the apparatus of the present invention for continuously chopping, pulverizing and mixing the frozen raw material.
Figure 2:
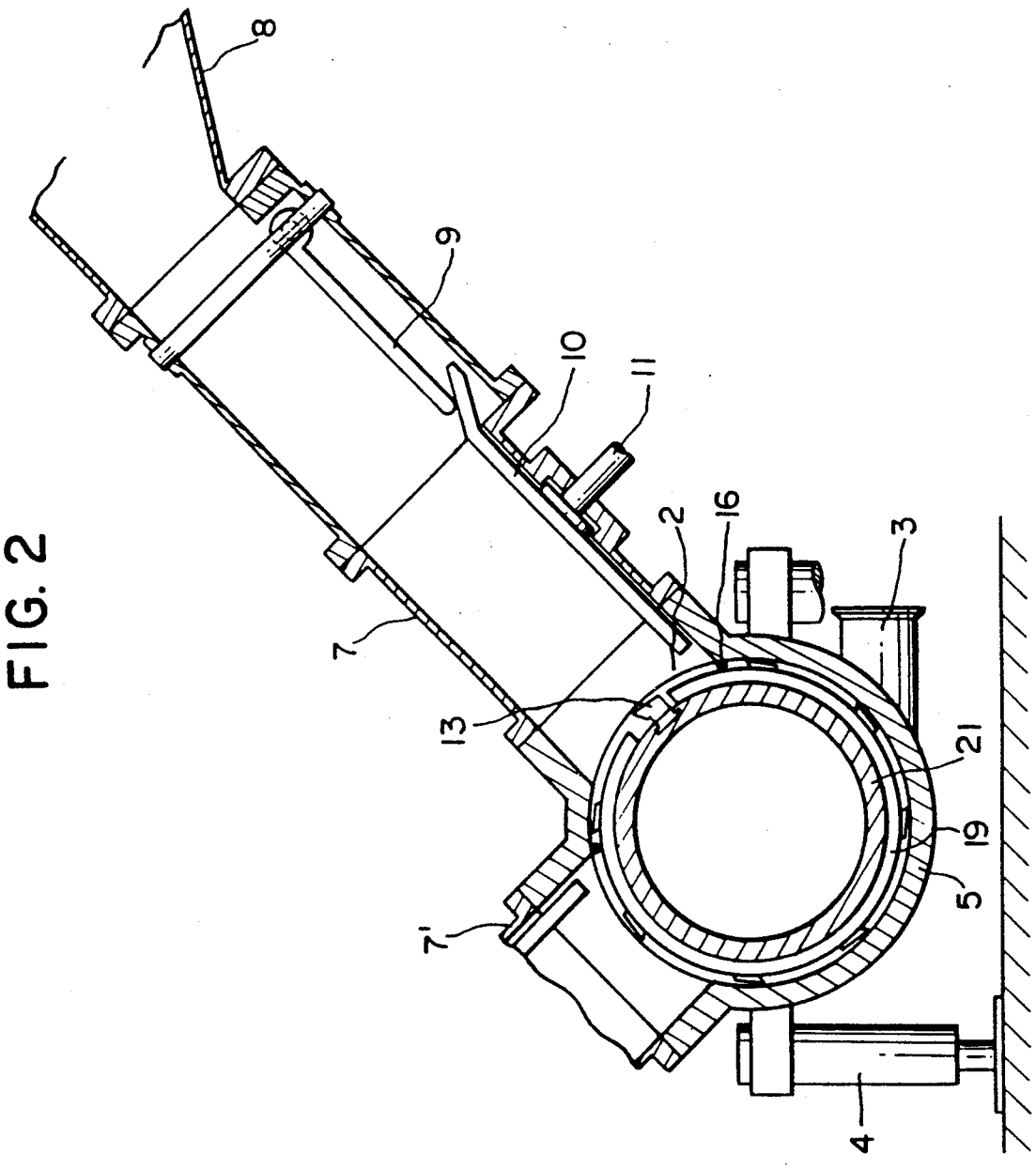
FIG. 2 is a longitudinal sectional view of the chopping unit.

FIG. 1 is a block diagram of the apparatus of the present invention. In FIGS. 2 to 5, a chopping unit of the present invention is shown. In FIGS. 6 to 9, chopping knives employed in the chopping unit are shown.

In the drawings: the reference numeral 5 denotes a chopping cylinder with closed opposite ends; 2, 2' a square-shaped inlet opening of the chopping cylinder 5, through which inlet openings blocks 1, 1' of a frozen raw material and an auxiliary raw material thereof are respectively supplied to the chopping cylinder 5. The inlet openings 2 and 2' are provided respectively in an upper portion of the chopping cylinder 5 so as to be spaced apart from each other in a circumferential direction of the chopping cylinder 5 by an angle of 90. Each of the inlet openings 2 and 2' is of the same size, viz., each substantially equals to ⅔ of the overall axial length of the chopping cylinder 5 and substantially equals to 1/6 of the overall circumferential length of the chopping cylinder 5. There may be employed only the inlet opening 2 for the raw material. It is also possible to reduce the size of the inlet opening 2' for the auxiliary raw material.

The inlet openings 2 and 2' are connected with feed sleeves 7 and 7', respectively. The feed sleeves 7, 7' extend outwardly in the radial direction of the chopping cylinder 5, through which feed sleeves 7 and 7' the frozen raw material and the auxiliary raw material are supplied to the inlet openings 2 and 2' of the chopping cylinder 5, respectively. In addition, the feed sleeves 7 and 7' are also connected, in their free-end portions, with hoppers 8 and 8', respectively. Each of the feed sleeves 7, 7' has a squareshaped cross section similar in shape to the inlet opening 2, 2'.

In the interior of each of the feed sleeves 7 and 7', a holding plate 10 for holding the blocks to be fed and movable guide plate 9 for smoothly guiding the blocks to be fed are so mounted that the movable guide plate 9 is interlocked with the holding plate 10. An actuator 11 for causing the holding plate 10 to press the blocks to be fed against an inner surface of each of the feed sleeves 7, 7' is mounted on an outer surface of each of the feed sleeves 7, 7'. In addition, further holding plats 10' and actuators 11' are also provided on both sides of the feed sleeves 7, 7' so that the blocks sandwiched thereby may be reciprocated in the axial direction of the chopping cylindet 5.

The chopping cylinder 5 is provided with a delivery opening 3 tangentally extending for discharging the chopped material therefrom on a bottom portion opposite to the inlet openings 2,2.

In the chopping cylinder 5, a chopping rotary drum 21 is rotatably mounted which is provided with a feed screw 19 on its outer peripheral surface, spirally extending along the axis of the chopping rotary drum 21. The feed screw has a substantially square-shaped cross section.

Figure 4:
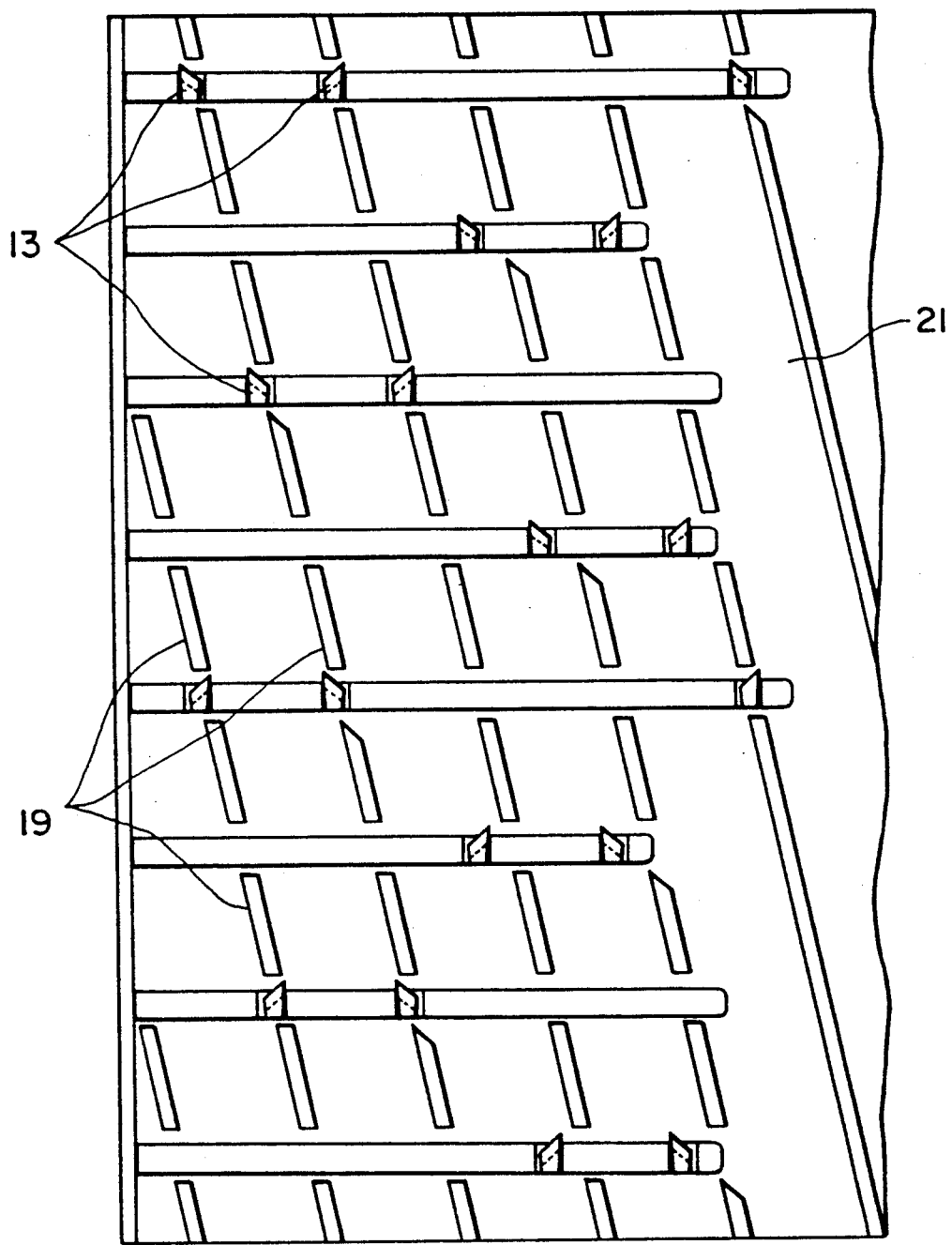
FIG. 4 is a development of the pulverizing rotary drum of the pulverizing unit.
Figure 5:
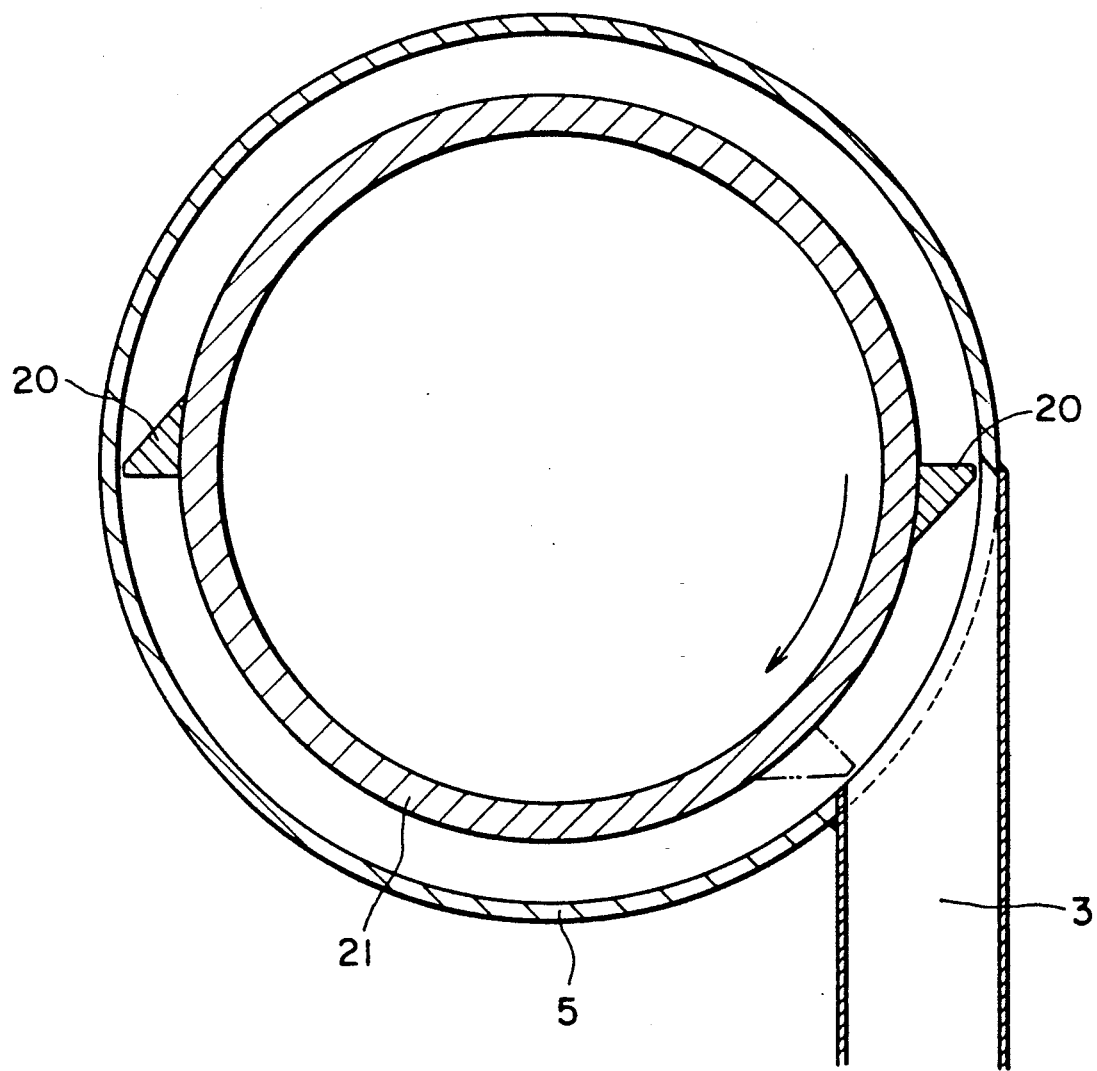
FIG. 5 is a cross-sectional view of the chopping unit taken along the line V—V of FIG. 3.
Figure 8:
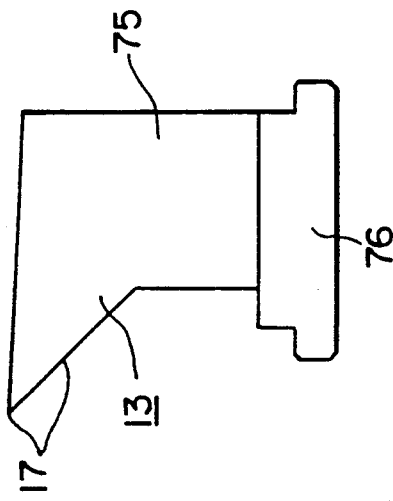
FIG. 8 is a right side view of the chopping knife.
Figure 9:
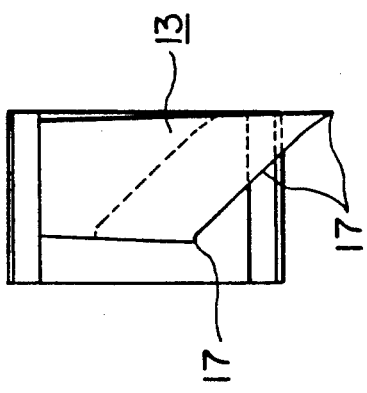
FIG. 9 is a plan view of the chopping knife.
Figure 6:
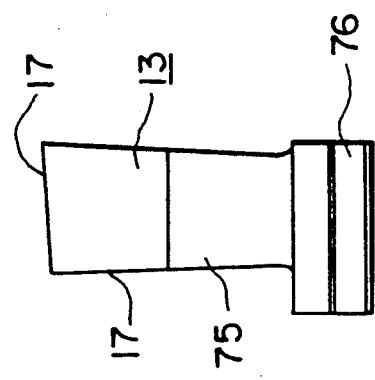
FIG. 6 is a front view of the chopping knife.
Figure 7:
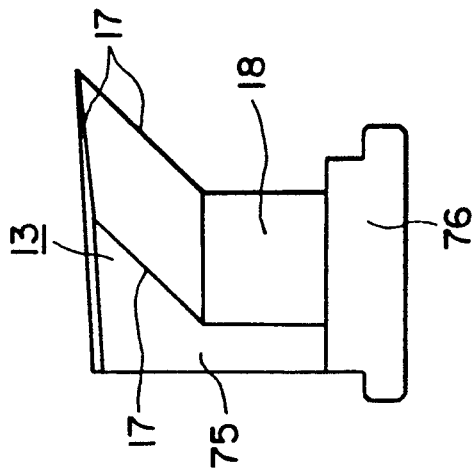
FIG. 7 is a left side view of the chopping knife.
Figure 10:
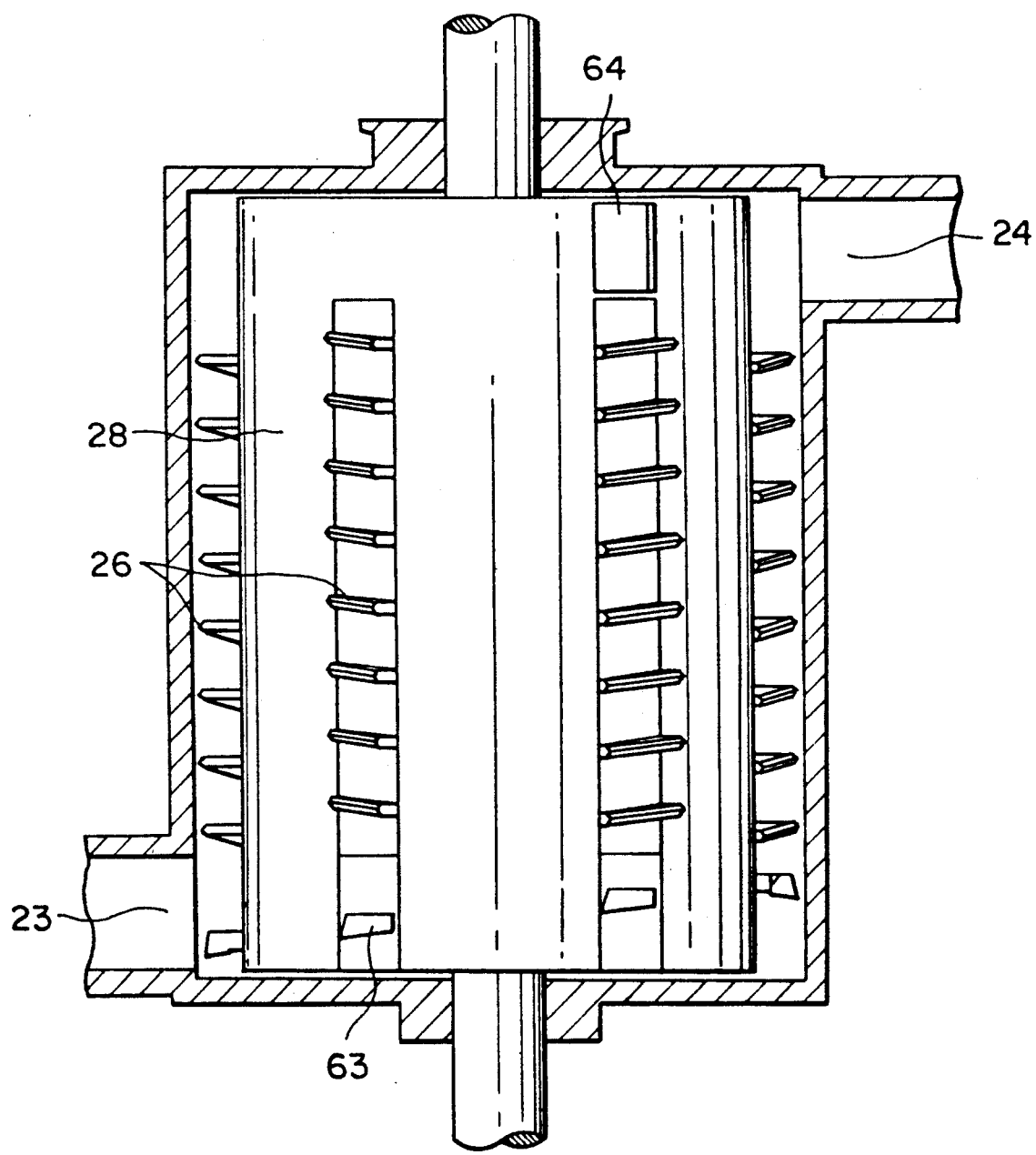
FIG. 10 is a longitudinal sectional view of the pulverizing unit.
Figure 12:
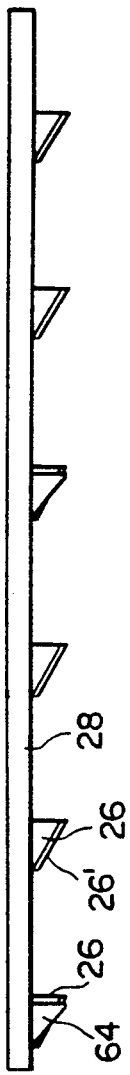
FIG. 12 is a plan view of the development of the pulverizing rotary drum of the pulverizing unit.
Figure 11:
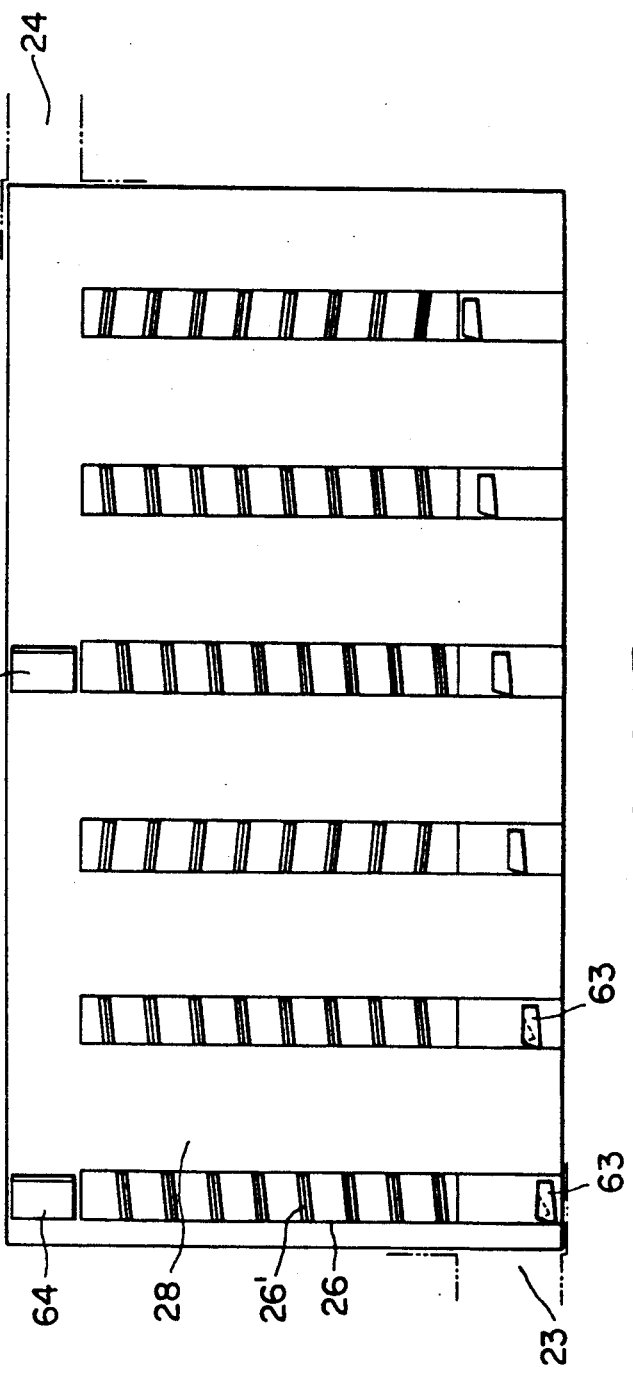
FIG. 11 is a front view of the development of the pulverizing rotary drum of the pulverizing unit.
Figure 13:
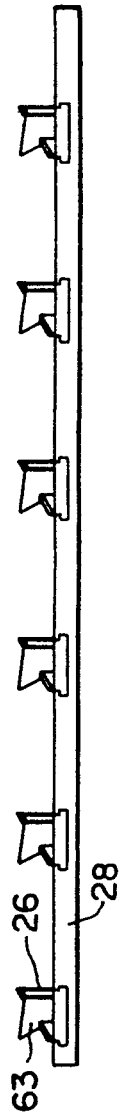
FIG. 13 is a bottom view of the development of the pulverizing rotary drum of the pulverizing unit.
Figure 14:
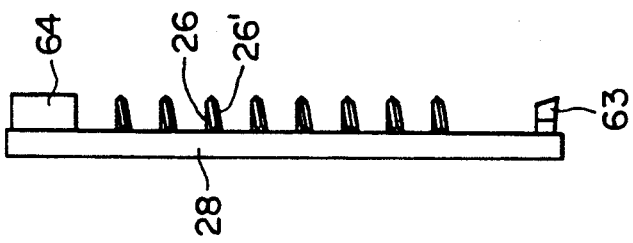
FIG. 14 is a left side view of the development of the pulverizing rotary drum of the pulverizing unit.
Figure 15:
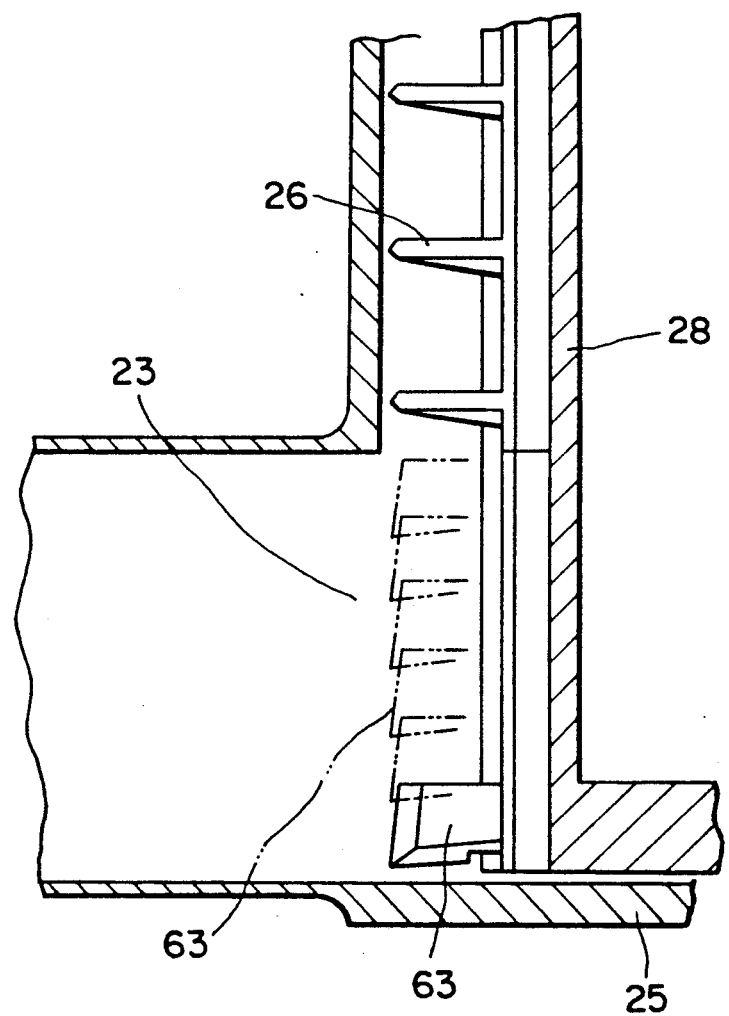
FIG. 15 is a partialy sectional view illustrating the relationship between the pulverizing cylinder, the pulverizing knives and the scraper blades of the pulverizing unit.
Figure 18:
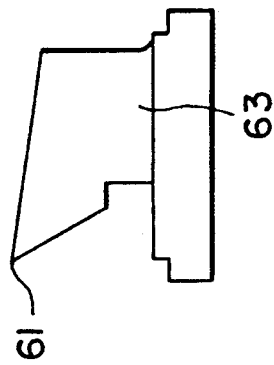
FIG. 18 is a right side view of the scraper blade.
Figure 19:
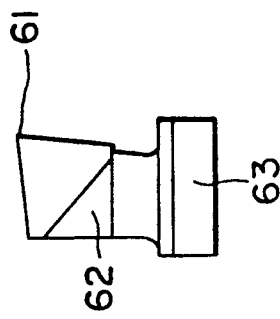
FIG. 19 is a plan view of the scraper blade.
Figure 16:
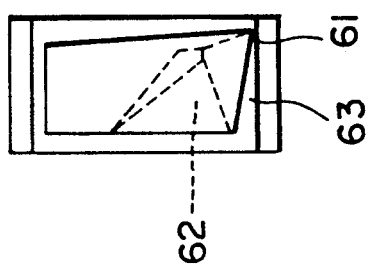
FIG. 16 is a front view of the scraper blade of the pulverizing unit.
Figure 17:
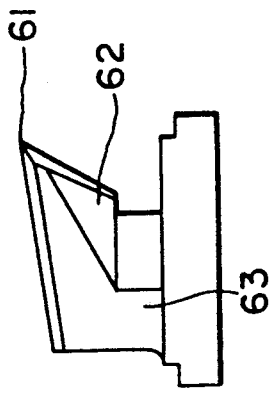
FIG. 17 is a left side view of the scraper blade.

As is clearly shown in FIG. 4, the feed screw 19 is provided with a plurality of notches which are spaced apart from each other at equal angular intervals of 45°. On each of the notches is mounted a chopping knife 13 which is preferably disengaged therefrom for cleaning, replacing or grinding.

As clearly shown in FIG. 6 to 9, the chopping knife 13 consists of a main body 75, a cutting edge 17 and a base 76 for mounting on the chopping rotary drum 21. The main body 75 assumes a substantially square cubical form and both a top surface and a right side surface extend forward to assume a wedge-like shape. The front-edge portions of the top surface and upper front-end portions of opposite side surfaces form the cutting edge 17. Consequently, the cutting edges 17 assume a substantially ⊓ (Goliath crane)-shaped form in front view. The front surface of the chopping knife 13 extending over the both side edges is slightly curved rearward and inward to enable articles of the chopped raw material to smoothly swallowed and flied horizontally and downward from the chopping knife 13. Any of the top surface and both side surfaces of the chopping knife 13 is substantially flat.

In addition, the top surface is substantially horizontal or slightly inclined sideward and rearward.

The chopping knife 13 shown in FIGS. 6 to 9 is used in pair with another symmetrical chopping knife 13.

An axial length in which the chopping knife 13 is to be located is substantially equal to that of the feed opening 2, 2', because the chopping knife 13 provided in an area beyond the feed opening 2, 2', because the chopping knife 13 provided in an area beyond the feed opening 2,2' substantially fails to do its functions.

Though, in the embodiment illustrated, there are employed eighteen pieces of the chopping knives 13, the number thereof may be of course varied. As shown in FIG. 4, the pair of the chopping knives 13 symmetrical with each other in shape are mounted, axially spaced apart at a predetermined distance or angularly spaced apart at intervals of a predetermine angle, so that there may appear, for example, the same pairs on an axially the same location angularly spaced apart at 180°. These pairs totalling to 18 chopping knives are axially spaced apart from each other at intervals of a predetermined length, while spaced apart from each other at equal angular intervals of 45°. Of course, the cutting edge 17 of each of the chopping knives 13 is oriented forward in a rotational direction of the chopping rotary drum 21.

The chopping knife 13 is slightly higher than the spiral ridge 19 such that the cutting edge 17 is substantially brought into contact with an inner surface of the chopping cylinder 5 and accordingly, a predetermined clearance is provided between an outer peripheral surface of the spiral ridge 19 and the inner surface of the chopping cylinder 5.

A auxialiary member 16 is mounted on an inner wall of the chopping cylinder 5 for preventing the chopped raw material from passing through the clearance between the inner wall of the chopping cylinder 5 and the outer peripheral surface of the spiral ridge 19. There is substantially no clearance between the inner surface of the chopping cylinder 5 and the auxiliary member 16. The auxiliary member 16 is provided with a plurality of notches 56 which permit the chopping knives 13 to pass therethrough.

Figure 3:
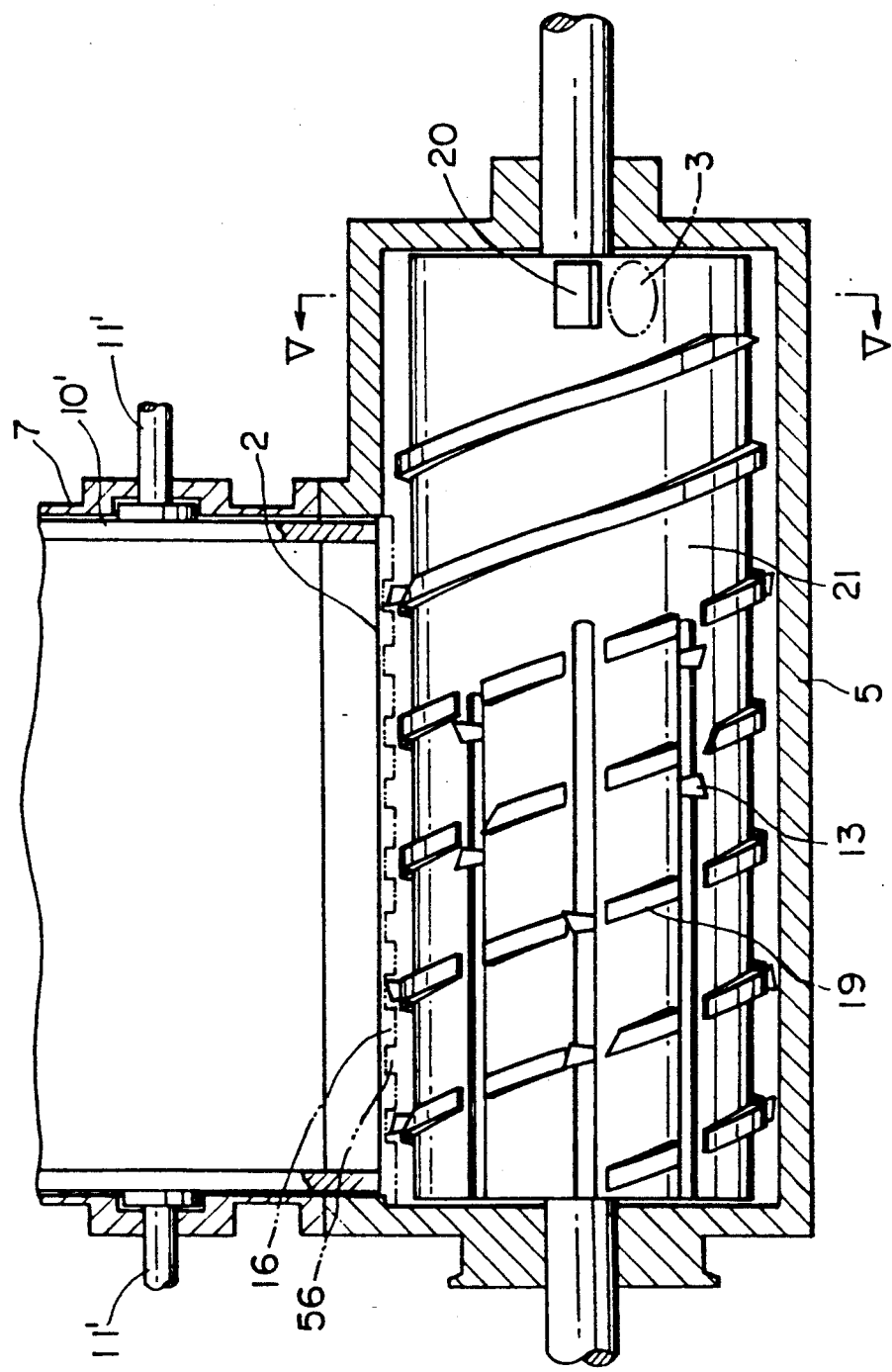
FIG. 3 is a cross-sectional view of the chopping unit.

A pair of delivery ridges 20 are formed on diametrically opposite sides in an outer peripheral surface of the chopping rotary drum 21 in a position corresponding to that of the delivery opening 3 of the chopping cylinder 5 (cf. FIGS. 3, 4). Each of the delivery ridges 20 assumes a substantially triangular shape in section and a slant surface thereof is oriented forward in the rotating direction.

FIGS. 10 to 15 show a pulverizing unit of the present invention, and FIGS. 16 to 19 a plurality of scraper blades employed in the pulverizing unit.

In the Figs., the reference numeral 25 shows a pulverizing cylinder with closed axial end portions. The pulverizing cylinder 25 is provided with an inlet opening 23 for receiving the chopped raw material on upper portion and an outlet opening 24 for discharging the pulverized raw material on lower portion. A pulverizing rotary drum 28 is rotatably mounted in the pulverizing cylinder 25.

On an outer peripheral surface of the pulverizing rotary drum 28, there are fixedly mounted six rows of pulverizing knives 26 which extend axially in perallel. Each of the pulverizing knives 26 consists of a common base and a plurality of substantially triangular cutting edges 26' which are integrally formed with the common base so as to extend radially outward in a direction perpendicular to the common base. Each of the cutting edges 26' is edged at an oblique side, and the oblique side is oriented upward. The oblique side is high at the leading portion and low at the trailing portion.

All of the cutting edges 26' of each row of the pulverizing knives extend parallel to each other. The cutting edges 26' are slightly deviated from the rotational direction of the pulverizing rotary drum 28.

With three adjacent rows of the pulverizing knives 26 taken as one set, the cutting edges 26' of the two among the three rows are arranged on the same positions in the circumferential direction of the pulverizing rotary drum 28 but differ in deviation from the rotational direction to opposite sides. In the remaining one row of the pulverizing knives, each cutting edge 26' is disposed in a position corresponding to an intermediate position between adjacent two rows of the pulverizing knives 26 and is so deviated from the rotational direction of the pulverizing rotary drum 28 that the leading edges orient toward the inlet opening 23 and the trailing edges orient toward the outlet opening 24. The last row serves to feed the pulverized raw material toward the outlet opening 24. Such two sets of three adjacent rows of the pulverizing knives are disposed at equal angular intervals in the outer peripheral surface of the pulverizing rotary drum 28.

It is preferable that the pulverizing knives are detachable as is in the case of the chopping knives.

In the outer peripheral surface of the pulverizing rotary drum 28 are provided six pieces of scraper blades 63 each being disposed at a position corresponding to that of the inlet opening 23 and being provided with a scraping edge 61 and an oblique feeding surface 62. The scraper blades 63 are disposed axially on the same rows as those of the pulverizing knives 26 and in a spiral manner so as to define a spiral path as a whole.

As shown in detail in FIGS. 16 to 19, each of the scraper blades 63 is substantially similar in construction to each of the chopping knives 13 and, as in case of the chopping knives 13, is mounted with each cutting edge oriented forward in the rotational direction.

An outermost end of the cutting edge of each of the scraper blades 63 is substantially brought into contact with an inner surface of the pulverizing drum 28.

Figure 20:
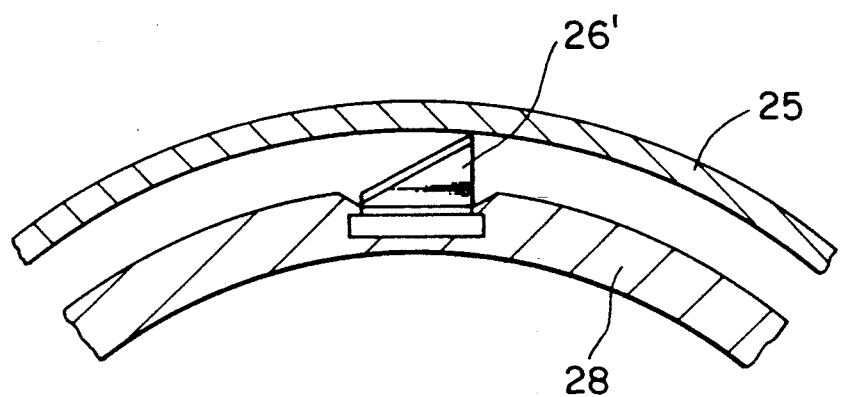
FIG. 20 is a partialy sectional view illustrating the relationship between the pulverizing knives and the pulverizing cylinder.

In FIG. 20, there are shown the relative positions of the pulverizing knives 26 of the pulverizing unit and the scraper blades 63 to the pulverizing cylinder 25, the relative positions of the scraper blades 63 to each other and the relative positions of the same to the chopped raw material inlet opening 23.

In a pair of positions corresponding to the pulverized material outlet opening 25, a pair of such feeding ridge portions 64 are provided at diametricaly opposite sides on the outer peripheral surface of the pulverizing rotary drum 28 that have the same construction as the delivery ridge portions 20 of the chopping drum 21.

As shown in FIG. 1, the chopping unit and the pulverizing unit are connected through a straight communication pipe 67 for feeding the chopped raw material at the delivery opening 3 of the chopping rotary drum 21 and the inlet opening 23 of the pulverizing rotary drum 28. In case where both units are connected by such pipe, it is preferable for the pipe to be as short a possible.

An upstream end portion of the communication pipe 67 for feeding the chopped raw material, viz., the portion 68 connected to the chopped material delivery opening 3 is slightly reduced in diameter. This is aimed at providing, immediately downstream of said portion through which the chopped raw material passes, some empty space for facilitating auxiliary raw material to be uniformly added there and also at having said portion served as a seal portion when the pulverizing unit is depressurized.

On suitable portions downstream of the small-diameter portion of the communication pipe 67 for feeding the chopped raw material is provided a connecting opening 71 connecting to a vacuum pump (not shown) for depressurizing both the insides of the communication pipe 67 and the pulverizing cylinder 25 and an input opening 72 for supplying the auxiliary raw material.

The pulverizing unit may be connected by a connecting means to a finishing unit for finishing the pulverized raw material to meat paste by further fining. Such connecting means may simply be a pipe as shown in FIG. 1 or the pulverizing unit and the finishing unit may integrally be connected with each other so that they may be driven by a common rotation shaft.

Figure 21:
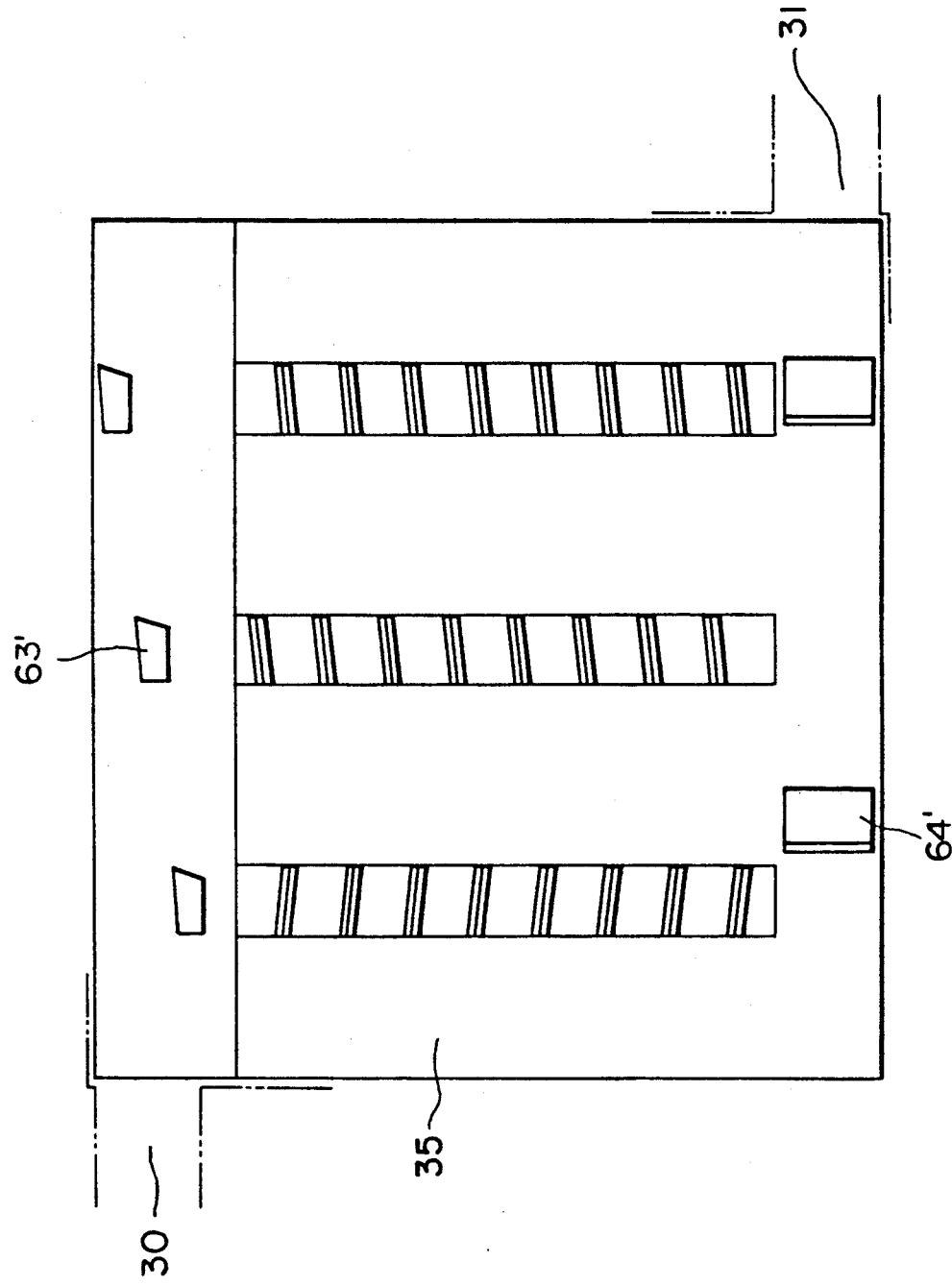
FIG. 21 is a development of finishing rotary drum.

The finishing unit is constructed of a finishing cylinder 32 and the finishing rotary drum 35 and it is substantially similar in construction to the pulverizing unit except that it is smaller in diameter as a whole than the pulverizing unit so that the peripheral speed of the finishing rotary drum may be lowered and that the finishing rotary drum is provided with only one set of three rows of finishing knives which are substantially similar in construction and arrangement to the pulverizing knives 26 (cf. FIG. 21).

As shown in FIG. 1, the pulverizing unit and the finishing unit are connected with the outlet opening 24 of the pulverizing cylinder 25 and an inlet opening 30 of the finishing cylinder 32 are connected through a straight communication pipe 73. In a suitable portion of said pipe is provided an inlet opening 74 for receiving the auxiliary raw material.

Figure 22:
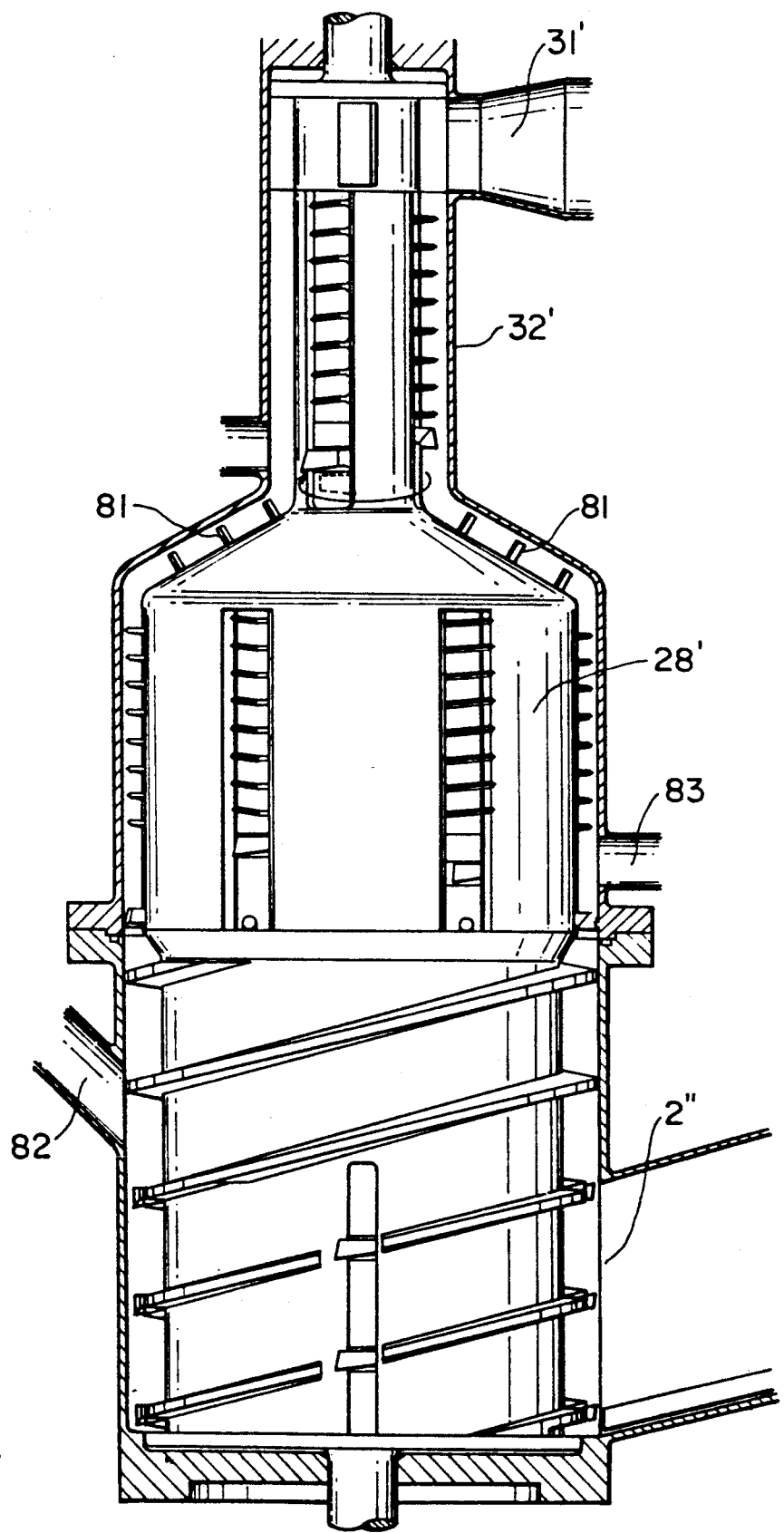
FIG. 22 is a modified embodiment of the apparatus of the present invention, in which embodiment the chopping unit, the pulverizing unit and the finishing unit are integrally combined with each other.

In the above embodiment, the chopping unit, the pulverizing unit and the finishing unit are separately constructed and assembled with the communication pipes, but these units may be integrally formed, with a single rotation shaft serving as a common shaft. Such embodiment is shown in FIG. 22. Each of the chopping unit, the pulverizing unit and the finishing unit of the modified embodiment is substantially similar in construction to that of the above-mentioned embodiment. In the modified embodiment of vertical type in which these units are axially connected with each other, raw material is received at an inlet opening 2" in the lowest portion and taken out at an outlet opening 31' on a top portion.

In this embodiment, the units are integrally formed as a single structure, so that it is not necessary for the raw material inlet openings and the processed material outlet openings to be separately mounted, and with the spaces between the cylinders and the rotary drums communicated with each other, the raw material is sent upward to be sequentially processed by the three units and taken out from the product outlet opening as a meat paste.

The finishing unit portion is constructed relatively small in diameter so that the peripheral speed may be lowered, and accordingly, the connecting portion between the pulverizing unit and the finishing unit is made frustroconical and on the outer peripheral surface of the rotary drum in the frustroconical portion are axially provided two rows of vanes 81 for moving the raw material upward.

In this embodiment, the reference numeral 82 indicates a first auxiliary material inlet opening, 83 a vent through which depressurization of the unit is effected and 84 a second auxiliary raw material inlet opening.

Now, operation of the continuous chopping, pulverizing and mixing by the apparatus shown in FIG. 1 will be described hereinbelow.

The frozen raw material 1 assuming a square-shaped block enters the feed sleeve 7. Since the feed sleeve 7 is inclined, the frozen raw material block 1 is graviated to the chopping rotary drum 21 to abut thereon. With the actuator 11 operated, the frozen block is pressed against the upper wall of the feed sleeve so as to be firmly held therein.

With the chopping rotary drum 21 rotated in this state, the block is scraped and chopped by the chopping knives 13 of the chopping rotary drum 21 such that plural square shaped portions are formed corresponding to ⊓ (Goliath crane)-shaped cutting edges of the knives 13. Accordingly, the amount per unit time of the raw material block scraped and chopped by the chopping knives 13 is always constant.

Since the chopping knives 13 are driven respectively on given circumferences, if the raw material block is simply fed, only such given portions are squarely scraped and chopped as above and other remaining portions are left unscraped and unchopped. This means that further chopping operations do not proceed. Therefore, the fed raw material block is reciprocally moved by the actuator 11' in the axial direction of the chopping rotary drum 21 at a specified speed. Thereby, the raw material block is sequentially chopped by a given thickness. When the raw material block is chopped by the given thickness, it is gravitated to commence the next chopping operation by the given thickness. As the raw material block is chopped, next block is supplied one after another. So long as the raw material block is supplied like this, the chopping proceeds at a specified amount per unit time.

Similarly, through another feed sleeve 7', a frozen auxiliary raw material such as egg white is fed to be chopped at a constant rate in the same manner as that of the frozen raw material block and uniformly mixed therewith. The auxiliary raw material is also chopped at a specified amount per unit time and mixed with the raw material, and accordingly there can be realized a uniform mixing.

The frozen raw materials are chopped into pieces of about 600 μm in particle size by the chopping unit. In such chopping, a number of ice pieces dispersed in these raw materials and broken through cutting impact by the chopping knives 13 serve respectively as a knife for further chopping the chopped raw material into small particle size.

Further, parallel since there are arranged the parallel chopping knives 13, the chopped raw materials are evenly distributed and suitably dispersed thereby to be sent by the delivery ridge portion 19.

This chopping operation is carried out using such raw material as frozen at a temperature of from −5 to −30° C., and containing uniformly dispersed ice. As a result, the chopping operation does not generate any heat, and, thus without any fear that denaturation of proteins occurs, there can be effected sufficient chopping which permits additives to react upon proteins.

The raw materials thus chopped is fed through the delivery opening 3 in a form of a porous bar to the communication pipe 67 by means of the choppings knives 13 which also serve to feed the chopped pieces and the ridge portion 19 of the chopping rotary drum 21. Since the communication pipe 67 is depressurized, gas in the raw material is extracted thereby and the raw material also insulated from outside air is restrained from being oxidized.

With the small diametered end of the communication pipe 67 provided in vicinity of the delivery opening 3, an empty space appears above the chopped raw material in the communication pipe 67 in a portion downstream thereof. Accordingly, specified amount of additives such as coagulating agents and the like are supplied from above to the chopped raw materials to flow there together in preparation for the continuous mixing at a given rate in the following pulverizing operation.

Entering the pulverizing unit through the inlet opening 23, the solid bar-shaped chopped raw material is pulverized and successively driven upward in dispersed condition by the scraper blades 63 into a space defined between the pulverizing rotary drum 28 and the pulverizing cylinder 25. The raw material of dispersed condition is pulverized in such dispersed and floating condition in the depressurized pulverizing cylinder 25 by the cutting edges of the pulverizing knives 26 and, at the same time is driven upward, with the coagulating agent dispersed and mixed, by the cutting edges which are arranged in an inclination relative to the rotational direction of the pulverizing knives. As this time, since the raw material is still in iced contion, the pulverized raw material pieces do not stick to each other to be coagulated keeping the dispersed and floating condition and are spattered by the pulverizing knives 26 which are arranged in an inclination relative to the rotational direction thereof. Thus, the pulverized raw material pieces are not moved simply linearly but three-dimentionally to be fully pulverized into particle size of 10 m or less. As a result, there can be effected full mixing with the additives. Further, since the pulverizing operation of the raw material is carried out in an iced condition, there can not be generated any heat which otherwise causes denaturation of proteins.

After completion of pulverizing process, the pulverized raw material is discharged from the outlet opening 24 to the finishing unit to enter through the communication pipe 73. The auxiliary raw material is added, if required, midway on the communication pipe 73. In the finishing unit substantially similar in costruction to the pulverizing unit, the raw material is further fround, mixed and finished slowly by the finishing knives which rotate at a slower speed than that of the pulverizing unit to give a meat paste which is discharged from the outlet opening 31'.

The temperature of the meat paste thus discharged from the finishing unit is substantially 0° C.

In the present invention, since the processing with employment of the frozen raw material is accomplished in a period of time the raw materials still remains icy, there is no fear of heat generation that otherwise causes denaturation of proteins to allow proteins to perform their functions to a maximum extent, with the raw material very finely pulverized.

As a result, not only there can be provided such raw material for producing the thermally-gelled protein foods that are superior in taste to those processed by the conventional art with employment of the same starting material but also there can be employed as a starting material such raw material e.g. shark meat, sinewy meat and the like that have not been employed heretofore to prepare a thermally-gelled protein foods with the same quality as those from the common raw material. As for fish meat, it is possible for the yield thereof be improved. In addition, such fish meat that could not been employed hitherto can now be employed as the raw material for the thermally-gelled portion foods.

Now, examples of preparation will be described below:

EXAMPLE 1

Preparation of Ground Animal Paste

Beef shank was pressed into a freezer pan and frozen therein at a temperature of $-25°$ C. to prepare five blocks each having a size of 340 mm$\times$570 mm$\times$120 mm and a weight of 24 Kg. The pH of the blocks was 5.54.

These blocks were chopped in the chopping unit at a rate of 887 Kg/hour. The particle size of the chopped raw material was from 0.1 to 1.0 mm.

As the same time, 9 kg of egg white blocks frozen at a temperature of $-25°$ C. were fed through another inlet opening of the chopping unit and chopped therein as above at a rate of 67 Kg/hour to into particle size of from 0.1 to 1.0 mm.

The chopped meat and egg white were uniformly mixed and was discharged from the chopping unit to the pulverizing unit through the communication pipe. The temperature of the raw material when discharged from the chopping unit was $-15°$ C. Insides of the communication pipe and the pulverizing unit were maintained at from $-10$ to $-60$ cmHg, with outside air cut off and using a vacuum pump. Midway on the communication pipe, a 0.4 Kg of sodium carbonate and a 1.4 Kg of purified sodium chloride were mixed to the chopped material respectively at rate of 3 Kg/hour and 10 Kg/hour.

The chopped raw material was further pulverized by the pulverizing unit at a rate of 967 Kg/hour. The pulverized raw material remained icy and the particle size thereof was about 5 $\mu$m in central value. The temperature of the pulverized raw material was $-5°$ C. when discharged from the pulverizing unit.

Then, with a 4.5 Kg of fluid egg yolk having a temperature of 5° C. continuously added midway at a rate of 33 Kg/hour by means of a fixed delivery pump and with outside air cut off, the pulverized raw material was fed to the finishing unit and finished therein at a rate of 1000 Kg/hour to give a bround paste having a pH of 6.60.

Sausage-like product made of the ground paste had a fixed red color even without employing any colorant and was good in water retention properties, resilient properties and taste.

EXAMPLE 2

Preparation of Sardine Ground Paste

Sardine mead was treated in the same manner as of Example 1, with the head, tail, internal organs and shin removed, to give five frozen blocks each having a size of 340 mm$\times$570 mm$\times$120 mm and a weight of 22 Kg. The pH of the blocks was 5.90.

These blocks were chopped by the chopping unit at a rate of 900 Kg/hour. The chopped sardine became particles having a particle size of from 0.1 to 1.0 mm.

At the same time, blocks of egg white frozen at a temperature of $-25°$ C. and weighing 6 Kg were fed to and chopped in the same chopping unit at a rate of 50 Kg/hour to particles having the same particle size of from 0.1 to 1.0 mm.

The chopped and substantially uniformly mixed sardine and egg white were discharged from the chopping unit to the pulverizing unit through the communication pipe. The temperature of the raw material was $-15°$ C. when discharged from the chopping unit. Both insides of the communication pipe and the pulverizing unit were maintained from −10 to −60 cm Hg using a vacuum pump and with outside air cut off. Midway on the communication pipe, a 0.4 Kg of sodium carbonate and a 2.1 Kg of purified sodium chloride were mixed to the chopped material respectively at a rate of 3 Kg/hour and 17 Kg/hour. The chopped raw material was pulverized by the pulverizing unit at a rate of 970 Kg/hour. The pulverized raw material remained icy and the particle size thereof was about 5 μm in central value. The temperature of the raw material was −5° C. when discharged from the pulverizing unit.

Then, with a 3.7 Kg of fluid egg yolk having a temperature of 5° C. continuously added at a rate of 30 Kg/hour by means of a fixed delivery pump and with outside air cut off, the pulverized raw material was fed to the finishing unit and finished therein at a rate of 1000 Kg/hour to give a sardine ground paste having a pH of 7.11.

Fish paste product made of the sardine ground paste was not of dumpling like texture but of a boiled fish paste that has such a texture and taste as those of conventional boiled fish paste. Because this product contained emulsified sardine oil, it was quite delicious, free from the smell of sardine.

EXAMPLE 3

Preparation of Soybean Ground Paste

Employing soybeans soaked in water to have a water content of 60.4% by weight, five frozen blocks each having a size of 340 mm×570 mm×120 mm and a weight of 26 Kg were prepared in the same manner as in Example 1. The pH of the blocks was 6.38.

These blocks were chopped by the chopping unit at a rate of 1000 Kg/hour. The particle size of the chopped raw material soybeans was from 0.1 to 1.0 mm. The temperature of the chopped raw material was −10° C. when discharged from the chopping unit.

The chopped soybeans were fed through the communication pipe to the pulverizing unit to be pulverized therein. Both the communication pipe and the pulverizing unit were depressurized to −10 to −60 cmHg using a vacuum pump and with outside air cut off. The pulverized raw material was of a particle form having a particle size of about 5 μm in central value and remained icy. The temperature of the ground paste was −5° C. when finished processing and the pH thereof was 6.07.

Tofu (Japanese traditional bean curd) made of the ground paste left a bean-curd refuse called "Okara" in amount of ½ compared to that in the conventional method.

EXAMPLE 4

Preparation of Euphausia Superba Ground Paste

Employing Euphausia superba having a salt content of 1.35% by weight, five blocks each having a size of 330 mm×590 mm×75 mm and a weight of 13.6 Kg were prepared in the same manner as in Example 1. The pH of the blocks was 7.10.

These blocks were chopped by the chopping unit at a rate of 1000 Kg/hour to particles having a particle size of from 0.1 to 1.0 mm. The temperature of the mixture was 15° C. when discharged from the chopping unit.

The chopped Euphausia superba was fed to the pulverizing unit through the communication pipe and pulverized therein. Insides of the communication pipe and the pulverizing unit were maintained from −10 to −60 cmHg using a vacuum pump and with outside air cut off. The Euphausia superba after pulverized still remained icy and had a particle size of about 5 μm in central value and the pH thereof was 6.91.

Examination of resulted ground paste of the euphausia superba revealed the protein composition as shown in the following table. This table shows a considerable increase of activated proteins. The grond paste of the euphausia superba can be used as a filler for the raw material of thermally-gelled protein foods.

TABLE

| Type of protein | Raw material euphausia superba | Ground Paste of euphausia |
| --- | --- | --- |
| water-soluble | 4.1 (wt. %) | 9.3 (wt. %) |
| salting-in | 0.7 | 3.6 |
| insoluble | 6.2 | 2.5 |

I claim:

1. A method for continuously chopping, pulverizing and mixing raw material comprising animal or fish meat, the method comprising the steps of:

continuously chopping, in a fixed amount, square-shaped blocks of raw material frozen at a temperature of from −5 to −30° C.;

adding, to the chopped raw material, 0–0.5 parts by weight of sodium carbonate or sodium bicarbonate and 0–5 parts by weight of sodium chloride or sodium caseinate based on 100 parts by weight of the chopped raw material to adjust the pH of the chopped material to a range of from 6 to 8;

mixing and pulverizing the pH adjusted chopped material; and adding, to the pulverized material, an emulsifying agent at a predetermined rate and emulsifying the mixture by further mixing.

2. A method for continuously chopping, pulverizing and mixing the raw material as set forth in claim 1, wherein:

the chopped material is deaerated under reduced pressure after chopping.

3. A method for continuously chopping, pulverizing and mixing beans, comprising the steps of:

coarsely grinding soybeans soaked in water and forming a square-shaped block frozen at a temperature of 5 to −30° C.;

chopping the block continuously into particles having a first particle size; and pulverizing the chopped material into particles having a second particle size substantially smaller than said first particle size.

4. An apparatus for continuously chopping, pulverizing and mixing animal meat, frozen fish meat and beans comprising:

a chopping unit constructed of;

a chopping cylinder (5) provided with at least one feed opening (2) for feeding the blocks of frozen raw material and at least one delivery opening (3) for discharging the chopped raw material, a chopping rotary drum (21) rotatably mounted in the chopping cylinder (5) and having both a spiral ridge portion (19) provided on its outer peripheral surface and forming a feed screw and plural pairs of chopping knives (13) each with a cutting edge oriented in a rotational direction of the chopping rotary drum, each pair of knives being arranged in a row parallel to the axis, and on the outer peripheral surface, of the chopping rotary drum, wherein each pair different in symmetry from each other are radially oppositely disposed on the outer peripheral surface of the chopping rotary drum, the pairs of the knives being equally spaced apart from each other in both circumferential and longitudinal directions of the chopping rotary drum, a feeding device (7, 8) provided in the feed opening (2) for feeding the block of frozen raw material therethrough, said feeding device being provided with means for reciprocally moving the raw material in an axial direction of the chopping rotary drum (21), an auxiliary member (16) provided in an inner wall of the chopping cylinder (5) for preventing the chopped frozen raw material from passing through a clearance between the inner wall of the chopping cylinder (5) and an outer peripheral surface of the spiral ridge portion (19), and a delivery ridge portion (20) formed in an outer peripheral surface of the chopping rotary drum (21) at a position corresponding to that of the delivery opening (3); and a pulverizing unit constructed of;

a pulverizing cylinder (25) provided with an inlet opening (23) for receiving the frozen raw material chopped by the chopping unit and an outlet opening (24) for discharging pulverized frozen raw material, and;

a pulverizing rotary drum (28) rotatably mounted in the pulverising cylinder (25), said rotary drum having a plurality of pulverizing knives (26) arranged on rows which extend in an axial direction, a plurality of scraper blades (61) each provided with a scraping edge and an oblique feeding surface (62) and arranged in spirally shifted positions corresponding to said inlet opening (23) so as to define a spiral path on the peripheral surface of the rotary drum, and feeding ridge portions (64) formed in positions corresponding to that of said outlet opening (24), each of said pulverizing knives (26) being formed with a sectionally triangular shaped edge portion having a cutting edge (26') on a hypotenuse thereof, said pulverizing knives of each row being fixedly arranged parallel to each other and slightly deviated from the rotational direction of the rotary drum, with the cutting edges directed upward and forwardly sloped in a rotational direction of the pulverizing rotary drum, such that, between a pair of rows wherein the pulverizing knives are each different in a direction of deviation but corresponding in position and another pair of similar rows, two rows of pulverizing knives are interposed, respectively so that an axial position of each knife of one pair of rows corresponds to that of another pair of rows and each direction of said deviation is oriented at its leading edge portion toward the raw material inlet opening (23) and at its trailing edge portion toward the outlet opening (24), said scraper blades (61) being arranged such that each oblique feeding surface (62) constitutes a spiral element for feeding upward, and said outlet opening (24) for the pulverized being arranged on a position corresponding to the delivery opening (3) of the chopping rotary drum (21).

5. An apparatus for continuously chopping, pulverizing and mixing according to claim 4 wherein said chopping cylinder (5) is provided with at least one feed opening for feeding a frozen auxiliary raw material.

6. An apparatus for continuously chopping, pulverizing and mixing according to claim 4 wherein said raw material block feeding device(7, 8) comprises a feed sleeve(7) connected to the feed opening (2) provided on the chopping cylinder(5) for feeding the frozen raw material and extending radially outward therefrom and a hopper(8) mounted on a free end portion of the feed sleeve(7), wherein the feed sleeve(7) has a first holding plate(10) for pressing the frozen raw material block against an upper wall of the feed sleeve; an actuator(11) for the holding plate(10); second holding plates(10') for grasping the frozen raw material to be reciprocally moved in an axial direction of the chopping rotary drum(21) and second actuators(11') for the second holding plates(10'), and the hopper is provided therein with a movable guide plate(9) whose movable-end portion is engaged with an upper-end portion of the first holding plate.

7. An apparatus for continuously chopping, pulverizing and mixing according to claim 4 wherein said pulverizing unit is connected to a finishing unit comprising;

a finishing cylinder(32) having an inlet opening(30) for receiving the pulverized raw material from the pulverizing unit and an outlet opening (31) for discharging the raw material subjected to a finishing treatment, and a finishing rotary drum(35) rotably mounted in the finishing cylinder(32), said finishing rotary drum having a plurality of finishing knives(33) arranged on rows which extend in an axial direction, a plurality of scraper blades(63') each arranged in spirally shifted positions corresponding to said inlet opening so as to define a spiral path on the peripheral surface of the rotary drum, and feeding ridge portions (64') formed in positions corresponding to that of said outlet opening(31), each of said finishing knives(33) being formed with a sectionally triangular shaped edge portion(33') having a cutting edge on a hypotenuse thereof, said finishing knives(33) of each row being fixedly arranged parallel to each other and slightly deviated from the rotational direction of the rotary drum, with the cutting edges directed upward and forwardly sloped in a rotational direction of the finishing rotary drum, such that, between a pair of rows wherein the finishing knives are each different in direction of deviation but corresponding in position and another pair of similar rows, two rows of finishing knives are interposed, respectively so that an axial position of each knife of one pair of rows corresponds to that of another pair of rows and each direction of said deviation is oriented at its leading edge portion toward the raw material inlet opening(30) and at its trailing edge portion toward the outlet opening(31).

8. An apparatus for continuously chopping, pulverizing and mixing according to claim 4 wherein said chopping unit and pulverizing unit are integrally connected, with each cylinder and rotary drum integrally connected, wherein each rotary drum is rotated by a single common rotation shaft.

9. An apparatus for continuously chopping, pulverizing and mixing according to claim 7 wherein said chopping unit, pulverizing unit and finishing unit are connected with each cylinder and rotary drum integrally connected wherein each rotary drum is driven by a single common shaft.

10. An apparatus for continuously chopping, pulverizing and mixing according to claim 4 wherein said chopping unit and pulverizing unit are connected through a communication pipe.

11. An apparatus for continuously chopping, pulverizing and mixing according to claim 7 wherein said chopping unit, the pulverizing unit and the finishing unit are connected through communication pipes in order.

* * * * *